United States Patent [19]

Silvera et al.

[11] Patent Number: 5,768,748
[45] Date of Patent: Jun. 23, 1998

[54] VACUUM ATTACHMENT FOR GROOMING CATS AND DOGS

[76] Inventors: Curtis Silvera, 750 Broadview Ave., Toronto, Ontario, Canada, M4K 2P1; Robert Silvera, 128 Bronte Road, Apt. 201, Oakville, Ontario, Canada, L6L 3C1; Tanya Silvera, 709 22nd Ave. North, Cranbrook, B.C., Canada, V1C 5J1

[21] Appl. No.: 645,800

[22] Filed: May 16, 1996

[51] Int. Cl.$^6$ .................................................. A01M 1/06
[52] U.S. Cl. ................................ 15/402; 15/339; 15/347; 15/421; 119/602; 119/664
[58] Field of Search .................................. 15/246.2, 339, 15/347, 393, 401, 402, 415.1, 419, 421; 119/602, 664, 677; 132/148

[56] References Cited

U.S. PATENT DOCUMENTS

| | | | |
|---|---|---|---|
| 1,106,231 | 8/1914 | Marshall | 15/421 |
| 1,859,132 | 5/1932 | Fechtenburg | 15/402 |
| 2,276,886 | 3/1942 | Smith | 15/402 |
| 2,596,807 | 5/1952 | Dippel . | |
| 2,910,717 | 11/1959 | Raymond | 15/339 |
| 2,953,808 | 9/1960 | Carmack | 15/402 |
| 3,574,885 | 4/1971 | Jones | 15/402 |
| 4,175,352 | 11/1979 | Catlett . | |
| 4,279,095 | 7/1981 | Aasen | 15/402 |
| 4,485,583 | 12/1984 | Planty . | |
| 4,630,329 | 12/1986 | Shores | 15/402 |
| 4,833,753 | 5/1989 | Muller . | |
| 4,918,857 | 4/1990 | Wade et al. | 15/402 |
| 4,979,330 | 12/1990 | Rorant . | |
| 5,074,006 | 12/1991 | Eremita | 15/402 |
| 5,095,853 | 3/1992 | Kruger . | |
| 5,211,131 | 5/1993 | Plyler . | |
| 5,305,495 | 4/1994 | Nelsen et al. | 15/347 |
| 5,435,327 | 7/1995 | Ho . | |

*Primary Examiner*—Terrence Till
*Attorney, Agent, or Firm*—Riches, McKenzie & Herbert

[57] ABSTRACT

A vacuum attachment for grooming animals such as cats and dogs has a trap for receiving fleas and other matter carried by animals in their coats. The trap has a hollow body with an inlet connectable to a vacuum head and an outlet connectable to the inlet of a vacuum system. The trap body has a central barrier in the inlet providing an annular air flow inlet between the barrier and the trap body, and a filter screen adjacent the outlet to retain fleas and other matter entering the trap body through the annular air inlet.

8 Claims, 3 Drawing Sheets

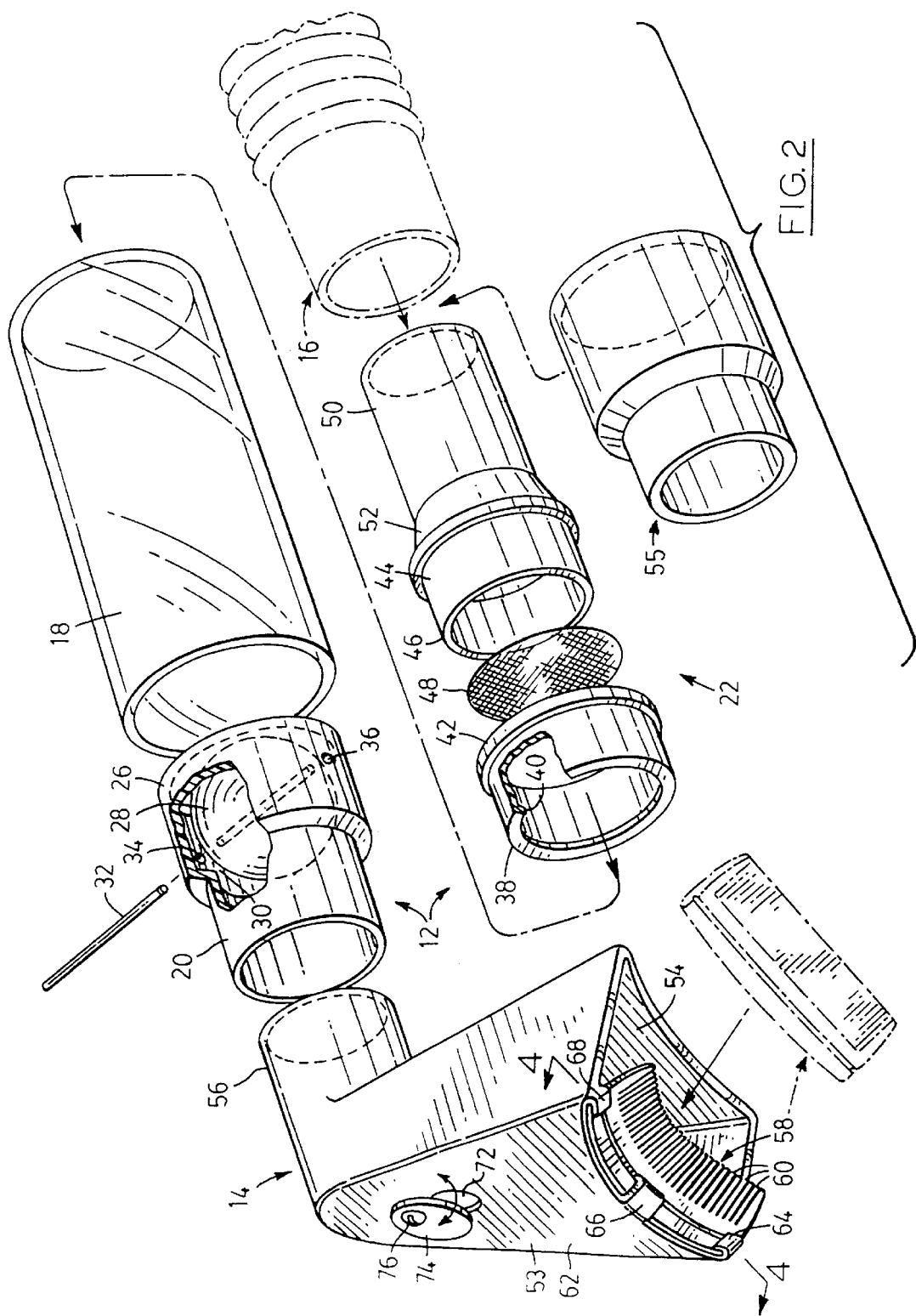

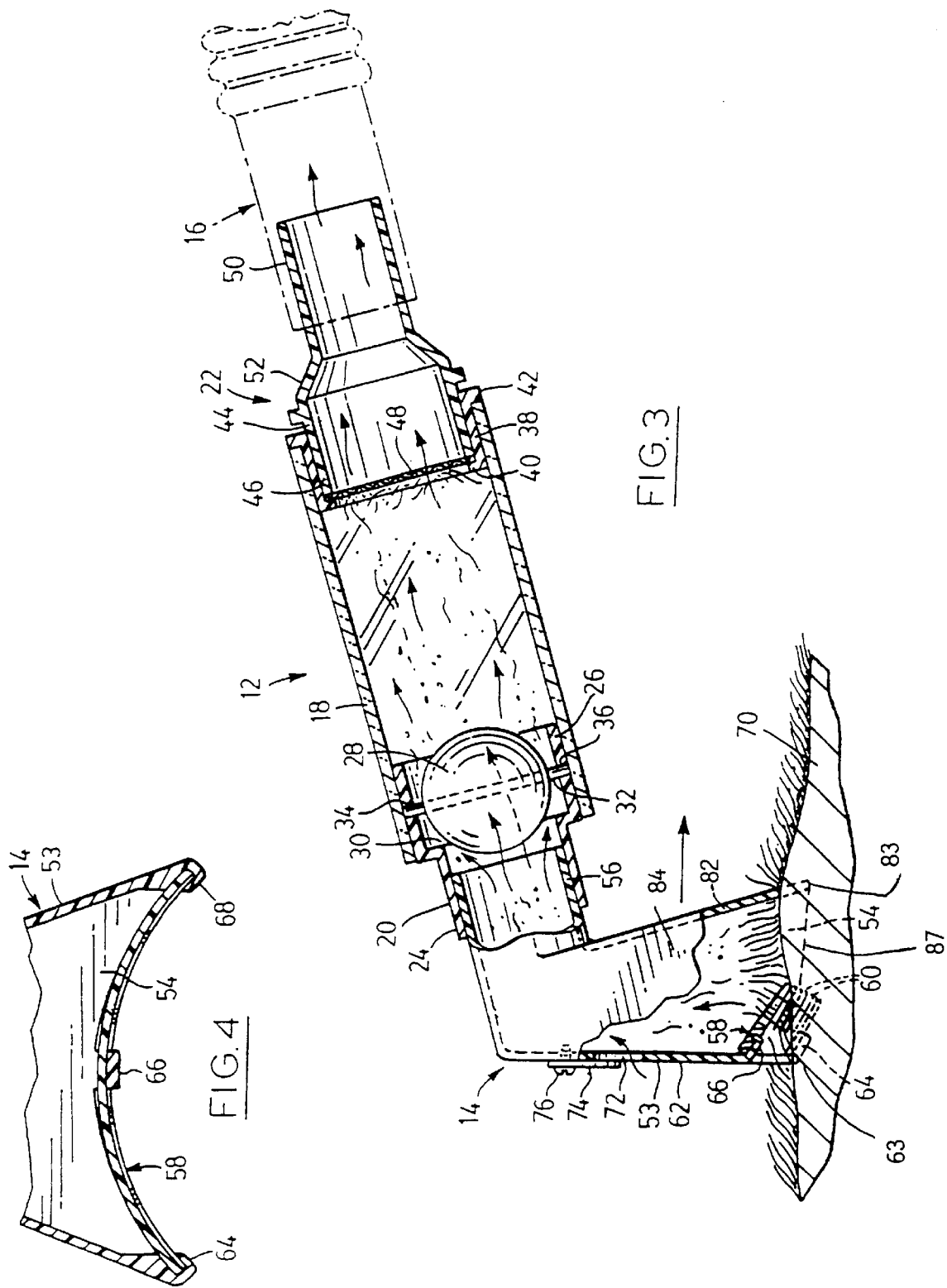

VACUUM ATTACHMENT FOR GROOMING CATS AND DOGS

BACKGROUND OF THE INVENTION

This invention relates to vacuum attachments for grooming animals such as cats and dogs.

Various devices have been proposed in the past for vacuuming fleas or other matter from the coats of animals, but it appears that for one reason or another none has become commercially successful.

SUMMARY OF THE INVENTION

It is therefore an object of this invention to provide an improved vacuum attachment of this kind.

According to the present invention, a vacuum attachment for grooming animals such as cats and dogs comprises a trap for receiving fleas and other matter carried by animals in their coats, the trap having a hollow body with an inlet connectable to a vacuum head and an outlet connectable to the inlet of a vacuum system, the trap body having a central barrier in the inlet providing an annular air flow inlet between the barrier and the trap body, and a filter screen adjacent the outlet to retain fleas and other matter entering the trap body through the annular air inlet.

The central barrier may be a spherical member. Advantageously, the filter screen is detachable from the trap body, the trap body inlet is detachably connectable to the vacuum head, and the trap body outlet is detachably connectable to the inlet of the vacuum system.

The invention may also include a vacuum head connectable to the inlet of the trap body of the vacuum attachment, the vacuum head having a transversely extending inwardly curved nozzle engageable with an animal, and a correspondingly curved comb member extending transversely across the nozzle, the comb member having a transversely extending row of teeth inclined to engage an animal at an angle in the range of from about 140 to about 160 degrees when the nozzle is positioned on an animal.

BRIEF DESCRIPTION OF THE DRAWING

One embodiment of the invention will now be described, by way of example, with reference to the accompanying drawings, of which:

FIG. 2 is an exploded perspective view of the vacuum attachment and vacuum head assembly, FIG. 3 is a longitudinal cross-sectional view of the vacuum attachment and vacuum head assembly, and FIG. 4 is a sectional view of the nozzle of the vacuum head taken along the line 4—4 of FIG. 2.

DESCRIPTION OF THE PREFERRED EMBODIMENT

Figure 1:
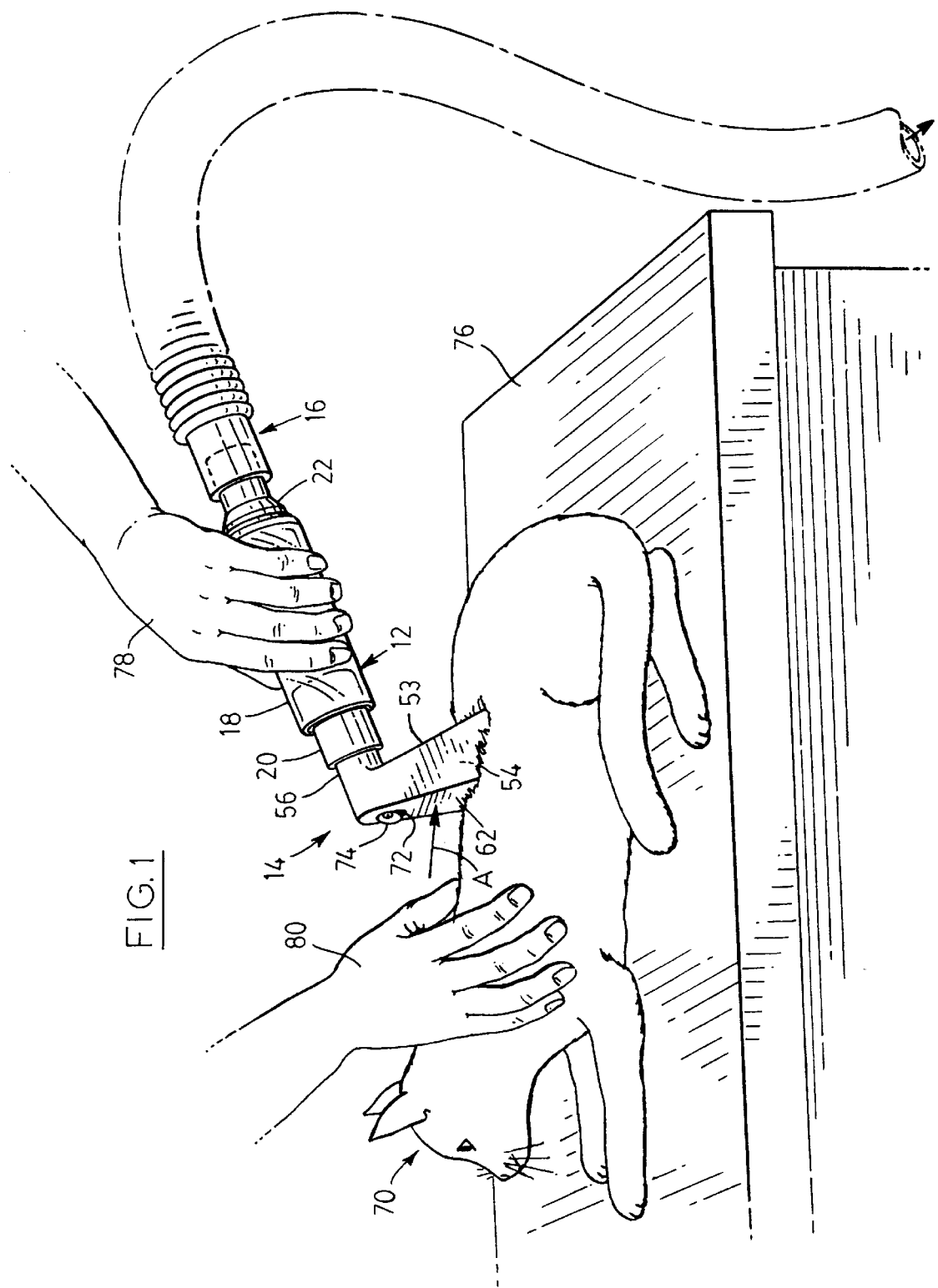
FIG. 1 is a perspective view of the vacuum attachment and vacuum head assembly in accordance with one embodiment of the invention being used to groom a cat.

Referring to the drawings, a vacuum attachment for grooming animals such as cats and dogs includes a trap 12 for receiving fleas and other matter carried by animals in their coats which, in use, is interposed between a vacuum head 14 and a conventional vacuum hose 16 attached to a conventional vacuum system (not shown).

The trap 12 has a transparent cylindrical body 18, a cylindrical inlet connector 20 and a cylindrical outlet connector 22. The inlet connector 20 has a front portion 24 for receiving the vacuum head 14, as will be described in more detail later, and a rear portion 26 of slightly larger diameter than the front portion 24 which is a slidable friction fit in the front end of the trap body 18.

The rear portion 26 of the inlet connector 20 contains a centrally located spherical barrier member 28 in the form of a ball which provides an annular air flow inlet 30 between the ball 28 and the wall of the inlet connector rear portion 26. The ball 28 is retained in position by a retaining rod 32 which passes through the ball 28 and has its outer ends mounted in diametrically opposite apertures 34, 36 in the wall of the inlet connector rear portion 26.

The outlet connector 22 has a first cylindrical part 38 which is a slidable friction fit in the rear end of the body 18. The first part 38 has an inwardly extending flange 40 at its front end (for a purpose which will be described later), and an outward extending flange 42 at its rear end which abuts the rear end of the body 18. The outlet connector 22 also has a second cylindrical part 44 with a front portion 46 which is a slidable friction fit in the first part 38. A circular filter screen 48 is mounted between the inwardly extending flange 40 of the first part 38 and the front end of the first portion 46 of the second part 44.

The second part 44 of the outlet connector 22 also has a medial portion 52 of reducing diameter between the front part 46 and a rear portion 50 which is a slidable friction fit in the vacuum hose 16. In some cases, the vacuum hose 16 may have a diameter which requires a use of a cylindrical adapter, such as the adapter 55 shown in FIG. 2, between the outlet connector 22 and the hose 16.

The vacuum head 14 has a hollow main body 53 which is generally triangular in front view and which has a transversely extending inwardly curved and generally rectangular nozzle 54 at its lower end. The upper end of the body 53 has a rearwardly extending cylindrical outlet connector 56 which is a slidable friction fit in the front portion 24 of the trap inlet connector 20.

A transversely curved comb member 58 with teeth 60 is mounted in the nozzle 54 adjacent the rear wall 62 of the body 53. The edges of the nozzle 54 are provided with three lugs 64, 66, 68 which retain the comb member 58 in position. The comb member 58 is of resilient material and the lugs 64, 66, 68 are positioned so that the comb member 58 can be snapped into and out of the base, as indicated in dotted outline in FIG. 2.

As shown in FIG. 3, the comb member 58 is mounted in an inclined position in the vacuum head 14 so that the comb teeth 60 engage an animal, i.e. cat 70, at an angle of 150° when the nozzle 54 is seated on the animal.

The rear wall 62 of nozzle body 53 has an aperture 72 with a manually movable cover 74 secured to the wall 62 by a screw 76 adjacent the aperture 72, so that the cover 74 can be moved to vary the operating area of aperture 72.

In use, the vacuum head 14 and vacuum attachment 12 are assembled and connected as shown, and the cat 70 is placed on a table 76. The operator uses one hand 78 to hold the vacuum attachment 12 and the other hand 80 to hold the cat 70. The nozzle 54 is placed on the cat 70 and moved rearwardly over the cat's coat, as indicated by the arrow A in FIG. 1. As can be clearly seen in FIG. 3, the comb teeth 60 are inclined at an angle of 150° to the cat 70. Drawing of the comb teeth 60 through the cat's fur coat at this angle causes fur and other matter to be dislodged therefrom and sucked up by the vacuum into the vacuum head 14 and into the vacuum attachment 12 through the annular passage 30 between the ball member 28 and the wall of the inlet connector rear portion 26. The fleas and other matter then impinge against the filter screen 48, which retains them in the vacuum attachment 12. The position of aperture cover 74 can be adjusted to vary the operative area of aperture 72 to obtain the best results in any particular instance.

When the grooming has been completed, the vacuum is switched off. If any fleas are still alive, it is unlikely that they can escape from the vacuum attachment 12 because it is difficult for them to find the annular passage 30 surrounding the ball member 28.

When convenient, the vacuum head 14 is removed from the vacuum attachment 12 and the vacuum attachment 12, is removed from the hose 16. The vacuum attachment 12 can then be held under a running hot water tap so that hot water flows through the attachment 12 from the outlet connector 22 to the inlet connector 20 to flush the fleas and other matter therefrom.

The advantages of the invention can readily be appreciated by the foregoing description of a preferred embodiment. It has also been found that the vacuum head 14 is not only effective in removing fleas and other matter from the coat of a cat or dog but also gives the animal a shiny, soft, dry-cleaned coat.

Referring again to the vacuum head 14, the main body 53 forms a hollow housing providing a passageway therethrough from a nozzle inlet 54 at one first upstream end and an outlet being the outlet connector 56 at a second downstream end. The second downstream end is connectible to the vacuum system for air flow into the housing via the nozzle inlet 54, through the passageway downstream to the outlet to exit the housing via the outlet connector 56. The main body 53 about the nozzle inlet 54 comprises in effect a containment shroud. This shroud has a rear wall 62, a front wall 82 opposite the rear wall 62 and two opposing side walls 84 and 86 defining the passageway therethrough and with each of these four walls having leading edges defining a perimeter of the nozzle outlet 54. The leading edges 83 and 63 respectively of each of the front wall 82 and the rear wall 62 are disposed in an arcuate shape, arching from one side wall 84 to the other side wall 86 such that middle portions of the leading edges 83 and 63 of each of the front wall 82 and the rear wall 62 are, with increased distance from the side walls 84 and 86, increasingly farther downstream from the leading edges 85 and 87 of the side walls. A comb member 58 is carried on the rear wall 62. The comb member 58 has a spline 88 carrying a plurality of tines or teeth 60 each extending from the spline 88 to a distal end of the tine. The spline 88 of the comb member 58 extends across the rear wall 62 substantially from one side wall 84 to the other opposite side wall 86. The tines 60 extend from the spline 88 towards their distal end at an angle towards the front wall 82 and upstream into the directions of air flow through the nozzle inlet 54. The distal ends of the tines 60 are disposed in an arcuate shape such that the distal ends of the tines are, with increased distance from the side walls 84 and 86 increasingly farther downstream.

The arcuate shape of the leading edges 83 and 63 of the front wall 82 and the rear wall 62 are shown to be similar and parallel. Similarly, the arcuate shape of the distal ends of the tines 60 is similar to the arcuate shape of the leading edge 63 of the rear wall 62.

The vacuum head 14 shown provides the shroud-like main body 53 to be substantially rectangular in cross section normal the direction of air flow and with the leading edges 85 and 87 of the side walls being substantially parallel with each other and straight.

As seen in FIGS. 1 and 3, on grooming a back of a cat with the leading edges of the front, rear and side walls engaging in a coat of the cat with the leading edges of the side walls generally disposed parallel the spine of the cat, the shroud-like main body 53 contains an area of the coat such that in drawing the shroud over the coat in a given forward direction longitudinally relative the spine as indicated by arrow A shown in FIG. 1, the comb member engages debris and/or fleas in the coat deflecting them downstream for entrainment in the flow of air as best seen in FIG. 3. The tines of the comb member are disposed at an angle of about 140 to 160 degrees to the back of the cat. It is appreciated that the front wall 82 is spaced from the distal ends of the comb member to define within the shroud-like main body 53 forward of the comb member 58 a substantial area wherein fleas in the coat are entrapped by air flow into the shroud against moving past the leading edges of the front, rear and side walls.

The vacuum head 14 therefore is adapted for grooming coats for cats and dogs by providing a nozzle with an inlet for engagement with a coat of a cat or dog. The nozzle has an arched configuration so as to engage over a back of a cat or dog and, while being drawn longitudinally in a given forward direction longitudinally of the spine of the cat or a dog, the nozzle is to remain engaged with a back of the cat or dog over an area extending longitudinally of the spine and to each side. The comb member 58 is carried inside the nozzle extending transversely and arched such that when the nozzle engages over the back of a coat or dog and is drawn longitudinally of the spine, the comb member remains engaged on the back of a cat or dog extending transversely over the back from side to side with tines of the comb member extending at an angle to the back of a cat or dog upstream into a direction of air flow into the nozzle and in the given forward direction.

Other embodiments will also be readily apparent to a person skilled in the art, the scope of the invention being defined in the appended claims.

We claim:

1. A vacuum head for grooming cats and dogs comprising:
    a hollow housing providing a passageway therethrough from an inlet at one first upstream end and an outlet at a second downstream end,
    the second end connectable to a vacuum system for air flow into the housing via the inlet and through the passageway downstream to the outlet to exit the housing via the outlet,
    the housing about the inlet comprising a containment shroud,
    the shroud having front, rear and opposite side walls defining the passageway therebetween with the walls having leading edges defining a perimeter of the inlet,
    the leading edges of each of the front wall and rear wall disposed in an arcuate shape, arching from one side wall to the other such that middle portions of the leading edges of each of the front wall and rear wall are, with increased distance from the side walls, increasingly farther downstream from the leading edges of the side walls,
    a comb member carried on the rear wall having a spline carrying a plurality of tines each extending from the spline to a distal end thereof,
    the spline of the comb member extending across the rear wall from substantially one side wall to the other side wall, the tines extending from the spline towards their distal ends at an angle towards the front wall and upstream, the distal ends of the tines disposed in an arcuate shape such that tines are, with increased distance from the side walls, increasingly farther downstream.

2. A vacuum head as claimed in claim 1 wherein the arcuate shape of the leading edges of the front wall and rear wall are similar.

3. A vacuum head as claimed in claim 2 wherein the distal ends of the tines are disposed in an arcuate shape similar to the arcuate shape of the leading edge of the rear wall.

4. A vacuum head as claimed in claim 1 wherein said comb member is removable.

5. A vacuum head as claimed in claim 1 wherein said shroud is substantially rectangular in cross-section normal the direction of air flow therethrough.

6. A vacuum head as claimed in claim 1 wherein the leading edges of the side walls are substantially parallel each other.

7. A vacuum head as claimed in claim 6 wherein the leading edges of the front and rear walls are substantially parallel each other.

8. A vacuum head as claimed in claim 1 wherein the front wall is spaced from the distal ends of the comb member.

\* \* \* \* \*